United States Patent [19]

Kasahara et al.

[11] Patent Number: 5,237,557
[45] Date of Patent: Aug. 17, 1993

[54] OPTICAL HEAD HAVING IMPROVED REFLECTING ASSEMBLY

[75] Inventors: Akihiro Kasahara, Kawasaki; Hideo Yamasaki; Akira Yamada, both of Yokohama; Hiroshi Saito, Tokyo, all of Japan

[73] Assignee: Kabushiki Kaisha Toshiba, Kawasaki, Japan

[21] Appl. No.: 723,339

[22] Filed: Jun. 28, 1991

[30] Foreign Application Priority Data

Jun. 29, 1990 [JP] Japan .................................. 2-173073

[51] Int. Cl.$^5$ ................................................ G11B 7/00
[52] U.S. Cl. .................................. 369/112; 369/44.23
[58] Field of Search .................... 369/112, 97, 44.23, 369/44.24, 118, 119, 121, 114, 32

[56] References Cited

U.S. PATENT DOCUMENTS

| | | | |
|---|---|---|---|
| 4,293,944 | 10/1981 | Izumita et al. | 369/112 |
| 4,823,334 | 4/1989 | Tanaka et al. | 369/112 |
| 4,862,441 | 11/1989 | Yumura et al. | 369/44.14 |
| 5,072,436 | 12/1991 | Honda | 369/112 |

FOREIGN PATENT DOCUMENTS

| | | | |
|---|---|---|---|
| 62-125549 | 6/1987 | Japan | 369/44.23 |
| 1-162235 | 6/1989 | Japan | 369/112 |
| 1-162243 | 6/1989 | Japan | 369/44.23 |

OTHER PUBLICATIONS

Patent Abstracts of Japan, vol. 9, No. 151 (p-367) Jun. 26, 1985, (Sharp KK) Feb. 13, 1985.
Patent Abstracts of Japan, vol. 12, No. 166 (p-704)(3013) May 19, 1988, (NEC Home Electronics LTD) Dec. 4, 1987.
Patent Abstracts of Japan, vol. 12, No. 8 (p-654)(2855) Jan. 12, 1988, (Mitsubishi Electric Corp) Jul. 24, 1987.
Patent Abstracts of Japan, vol. 12, No. 488 (p-803) Dec. 20, 1988, & (Canon Inc) Aug. 18, 1988.
Patent Abstracts of Japan, vol 14, No. 150 (p-1025(4093) Mar. 22, 1990 & (Matsushita Electric Ind Co Ltd) Jan. 16, 1990.
Patent Abstracts of Japan, vol 13, No. 448 (p-942)(3796) Oct 9, 1989, & (Toshiba Corp) Jul. 10, 1989.
Patent Abstracts of Japan, vol. 14, No. 360 (p-1088)(4303) Aug. 3, 1990, & (Mitsubishi Electric Corp) May 22, 1990.
Patent Abstracts of Japan, vol. 9, No. 62 (p-342)(1785) Mar. 19, 1985, & (Matsushita Denki Sangyo K.K.) Nov. 6, 1984.
Patent Abstracts of Japan, vol. 11, No. 219 (p-596) Jul. 16, 1987, & (Pioneer Electronic Corp) Feb. 17, 1987.

*Primary Examiner*—Andrew L. Sniezek
*Assistant Examiner*—Nabil Hindi
*Attorney, Agent, or Firm*—Oblon, Spivak, McClelland, Maier & Neustadt

[57] ABSTRACT

In an optical head, a light beam emitted from a semiconductor laser is guided to a carrier through a collimator lens and a beam splitter. An objective lens movable along an optical axis and a mirror having a oval reflecting surface are mounted on a carrier which is movable along a radial direction of an optical disk. The guided light beam is reflected from the mirror to the objective lens and is converged on the optical disk by the objective lens. The rear surface of the mirror is bonded to an adjusting member on a straight line which pass through the center gravity of the mirror and extends along the movable direction of the carrier.

19 Claims, 7 Drawing Sheets

PRIOR ART

OPTICAL HEAD HAVING IMPROVED REFLECTING ASSEMBLY

BACKGROUND OF THE INVENTION

1. Field of the Invention

The present invention relates to an optical head and, more particularly, it relates to an optical head incorporated into the optical information recording and reproducing apparatus for projecting laser beam on an optical medium to reproduce and record information from and on the optical medium.

2. Description of the Related Art

Various kinds of optical recording media such as the optical disk on which information can be optically recorded have been developed and as these optical recording media come into the market, the development of devices for reproducing information recorded on these optical recording media and for optically recording and reproducing information on and from these optical recording media has become more and more active and the improvement of optical heads which are to be incorporated into these devices has become more active as well. Further, various kinds of measures have been provided for positioning and adjusting optical parts which are important in the course of making these optical heads. The optical heads of this kind are adjusted according to the following two manners, for example.

Figure 1:
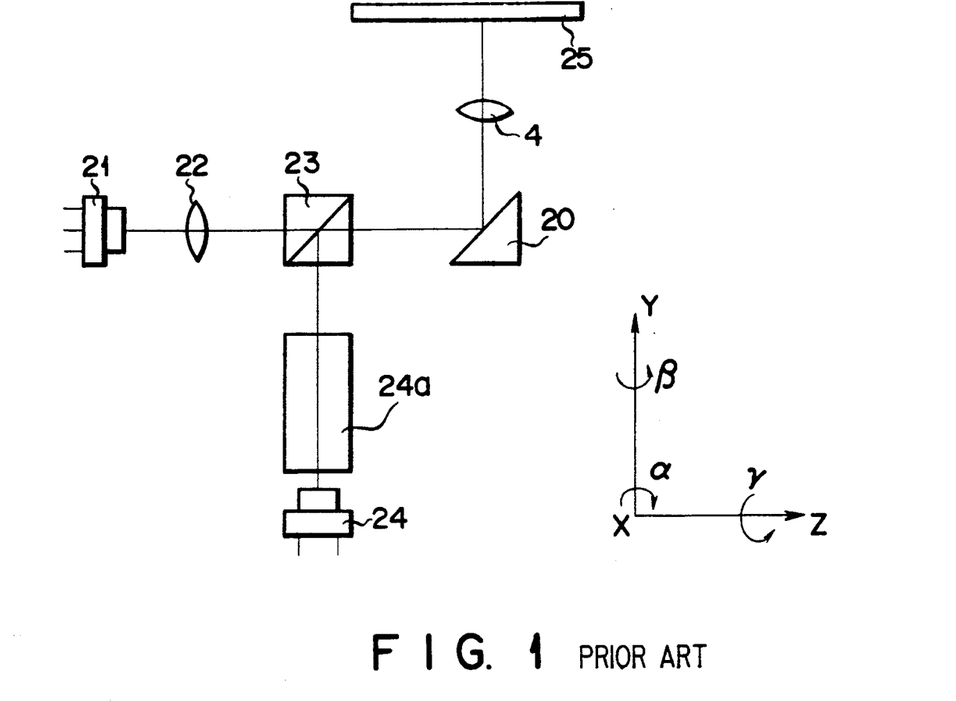
FIG. 1 schematically shows how the optical system of the conventional optical head is arranged.

FIG. 1 shows the optical system of the conventional optical head. In the case of this optical head, a divergent light beam emitted from a semiconductor laser 21 is collimated and converted to parallel beam by a collimator leans 22 and the parallel beam are focused on an optical recording medium 25 by an objective lens 4. Arranged between the objective lens 4 and the collimator lens 22 are a prism mirror 20 such as the triangular prism for reflecting the parallel light beam to the objective lens 4 and a beam splitter 23 for separating the detecting light beam reflected by the optical recording medium 25 from the light beam emitted from the semiconductor laser 21 to the optical recording medium. The detection light beam from the beam splitter 23 is lead to an optical detector 24 through a optical detecting system 24a.

Figure 2:
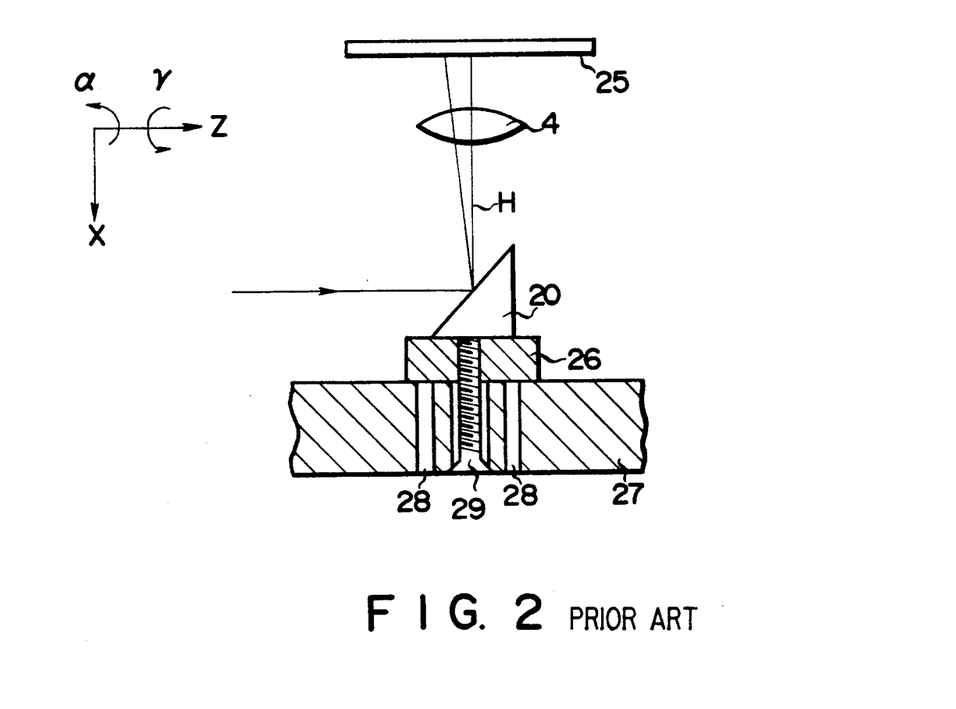
FIG. 2 is a sectional view showing how a prism mirror shown in FIG. 1 attached.

In the case of the optical system shown in FIG. 1, the prism mirror 20 is arranged as shown in FIG. 2. The mirror 20 is fixed on a mirror mount 26, which is fixed to a base 27 by means of a fixing screw 29. Arranged around the fixing screw 29 are three adjusting screws 28 for adjusting the tilt of the mirror mount 26. The optical system of this optical head is adjusted in such a way that relative positions of the semiconductor laser 21 and the collimator lens 22 are adjusted at first in directions X, Y and Z shown by the three-dimensional coordinates and that the parallel degree and travelling direction of the light beam are then adjusted after the light beam passes through the collimator lens 22. The beam splitter 23 is kept fixed over this process. The adjusting screws 28 shown in FIG. 2 are then turned and the tilt of the mirror 20 is thus adjusted to make the optical axis H of the mirror 20 substantially perpendicular to the optical recording medium 25. Further, the objective lens 4 is moved in the directions X and Y to cause its optical axis to coincide with the optical axis H and then turn-adjusted in directions shown by arrows o and Y in such a way that the aberration of beam spot formed on the optical recording medium becomes the smallest.

After the adjustment of the beam emitting and focusing optical system is finished as described above, the beam detecting optical system 24a and the optical detector 24 are adjusted and the adjustment of the optical head is thus finished.

According to the adjusting method of the optical head which comprises adjusting the tilt of the prism mirror 20 to cause the optical axes of the optical systems to coincide with each other as described above, however, the optical axis H of the mirror 20 which advances to the objective 4 is tilted at the time when the mirror 20 is adjusted. In order to cause the optical axis H of the mirror 20 to coincide with that of the objective 4, therefore, the mirror 20 must be adjusted in many directions such as X, Y, Z, α and γ, and the number of steps for adjusting the mirror 20 is large, too. Further, when the optical axis H of the mirror 20 is tilted, the position of readable end point on the optical recording medium is shifted relative to the optical head.

Figure 3:
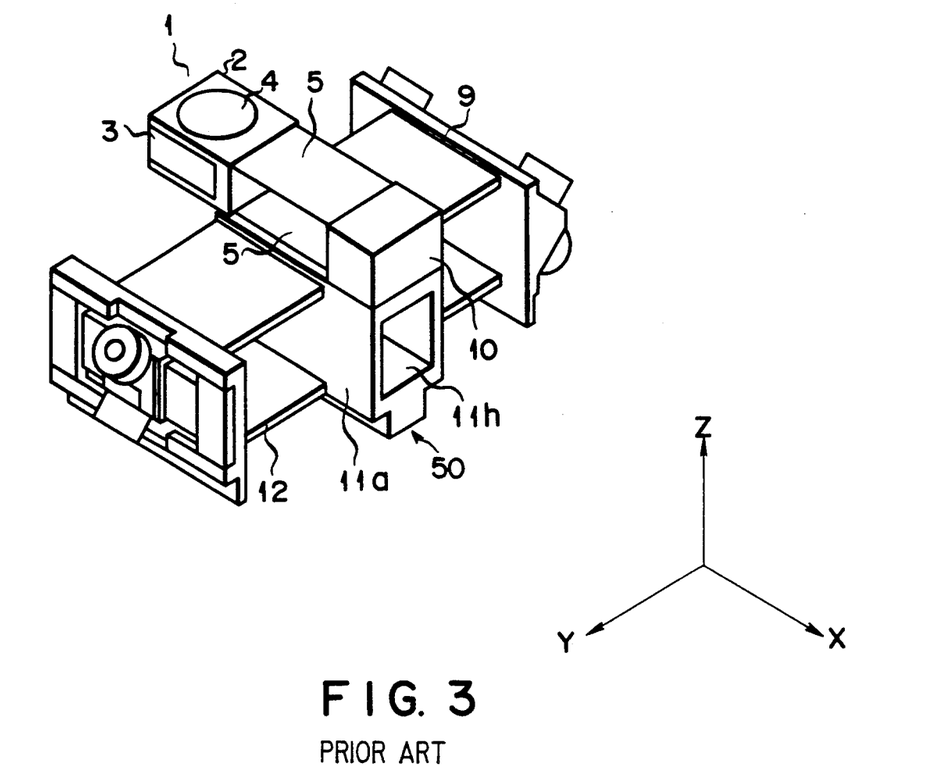
FIG. 3 is a perspective view showing the structure of the conventional optical head of separating type.
Figure 4:
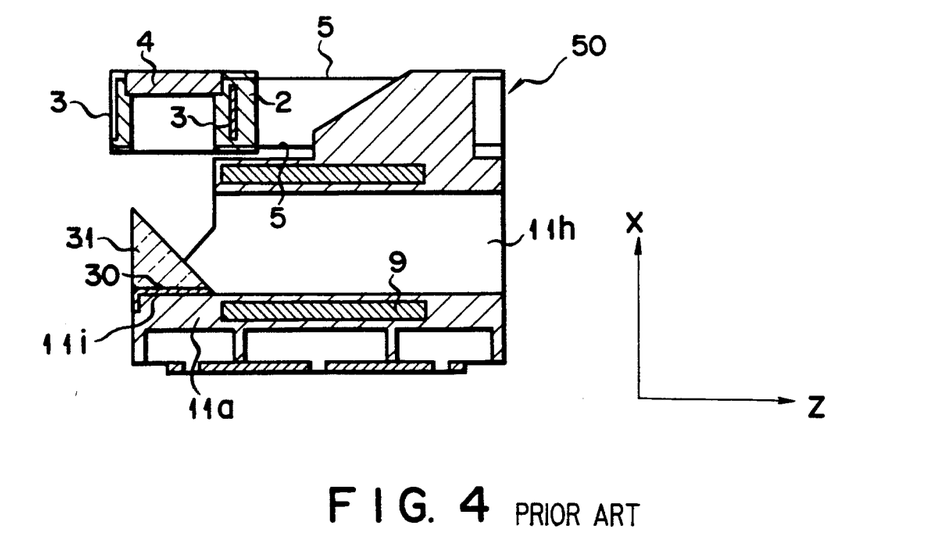
FIG. 4 is a sectional view showing how a prism mirror shown in FIG. 3 is attached.
Figure 5:
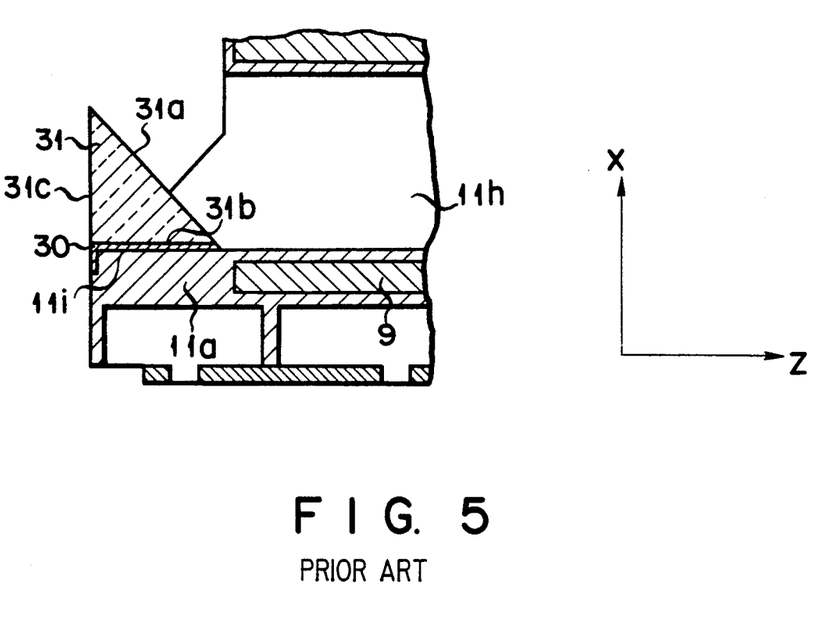
FIG. 5 is a sectional view showing a part of the mirror attaching arrangement in FIG. 4 enlarged.

FIG. 3 shows an optical head of separation type capable of being made small in size and light in weight, enhancing its productivity, being driven at high speed without causing any vibration and any tilting of its optical axis, and realizing high speed recording and reproducing of information. In the case of this optical head, the objective lens 4 for converging optical beam on the optical recording medium is held and driven in the direction of optical axis by a focus actuator 1. The focus actuator 1 is made of resin and molded integral to a linear motor 50 which is also made of resin and which serves to drive the objective 4 in a direction perpendicular to the direction of optical axis. A center carriage 11a for enhancing the rigidity of a tracking coil 9 is made cylindrical and provided therein with a hollow portion 11h through which optical beam can be passed. As shown in FIGS. 4 and 5, a prism mirror 31 is bonded to the carriage 11a under the objective 4 and the fixed beam sending optical system including a light source and a collimator lens, the fixed optical system for detecting light beam, and the optical recording medium or optical disk ar optically connected through the prism mirror 31. The beam sending optical system for transmitting light beam to the optical recording medium 25, the beam detecting optical system for detecting optical beam reflected by the optical recording medium and a detector may be mounted on the optical head.

In the case of the optical head arranged as described above, the tilt of the prism mirror is adjusted as follows to cause its optical axis to coincide with that of the objective.

Adhesive 30 is coated on a mirror-bonded area 11i extending from the bottom of the hollow portion 11h of the center carriage 11a. The prism mirror 31 which is shaped like a triangular pole is mounted on the layer of adhesive 30 and the tilt of the prism mirror 31 is adjusted until the adhesive 30 is hardened.

The reason why the adhesive layer is interposed between the prism mirror and the mirror-bonded area is as follows.

When the mirror 31 is bonded and fixed directly on the mirror-bonded area 11i without adjusting its tilt, it is difficult to completely align the optical axis of the prism mirror 31 with that of the objective lens 4 because the assembling accuracy of the linear motor 50 and the accuracy of parts for the linear motor 50 cannot be kept certain. When the adhesive 30 is interposed between the prism mirror 31 and the mirror-bonded are 11i and the tilt of the prism mirror 3 is adjusted in a certain direction prior to the hardening of the adhesive 30, the tilting of the prism mirror 31 can be easily achieved and the stable optical characteristic thereof can be realized. When the prism mirror 31 is previously adjusted to have a certain position and a certain tilt as described above, it can be chucked and held at its face except its reflecting and bonded faces 31a and 31b at the time of its being bonded on the mirror-bonded area 11i.

As described above, the prism mirror 31 is located relative to the mirror-bonded area 11i which is formed integral to the carriage 11a with a certain clearance interposed between them, and this clearance between them is filled with the adhesive 30. This is because the tilt of the optical axis of the prism mirror 31 can be easily adjusted when the adhesive 30 is present in the clearance and the tilt of the prism mirror 31 is adjusted in a certain direction prior to the hardening of the adhesive 30.

According to this manner, the prism mirror 31 must be held at a certain position in order that the prism mirror 31 is previously adjusted to occupy a certain position and have a certain tilt. Therefore, the prism mirror 31 is directly held with strong force but when it is held with strong force, its mirror face is deformed. In order to solve this, that face of the prism mirror 31 which is in opposite to its reflecting face 31a is used as a chucking face which is sucked by the vacuum pump or chucked by the adhesive tape to hold it at the time when it is bonded on the mirror-bonded area 11i. When it is held in this manner, however, it cannot be avoided that its chucking becomes unstable.

Further, the prism mirror 31 is bonded on the mirror-bonded area 11i over its bonded face by the adhesive 30. When adhesive, low in hardness, is used, therefore, unnecessary vibration such as tilting vibration is caused and the mirror face of the prism mirror 31 is deformed by the hardening of the adhesive and by the thermal deformation of it after it is hardened.

SUMMARY OF THE INVENTION

The object of the present invention is therefore to provide an optical head capable of more reliably fixing a mirror of the optical head and preventing unnecessary vibration from being caused and the mirror face of the mirror from being deformed.

According to the present invention, there is provided an optical head for retrieving information from an optical recording medium and/or recording information on the optical recording medium, comprising, generating means for generating light beam having a circular cross section, converging means for converging the light beam on the optical recording medium, responding means for responding to the light beam reflected from the optical recording medium, and reflecting means, having an oval reflecting surface, for reflecting the light beam emitted from the generating means to the converging means and reflecting the light beam from the optical recording medium to fold the optical path of the light beam.

According to the present invention is also provided an optical head for retrieving information from an optical recording medium and/or recording information on the optical recording medium, comprising, generating means for generating light beam having a circular cross section, converging means for converging the light beam on the optical recording medium, responding means for responding to the light beam reflected from the optical recording medium, reflecting means, having a reflecting surface and center of gravity, for reflecting the light beam emitted from the generating means to the converging means and reflecting the light beam from the optical recording medium to fold the optical path of the light beam, mounting means for mounting the converging means and the reflecting means to hold them movable in a moving direction, and fixing means for fixing the reflecting means to the mounting means on a line passing through the center of gravity of the reflecting means and extending along the moving direction of the mounting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 7:
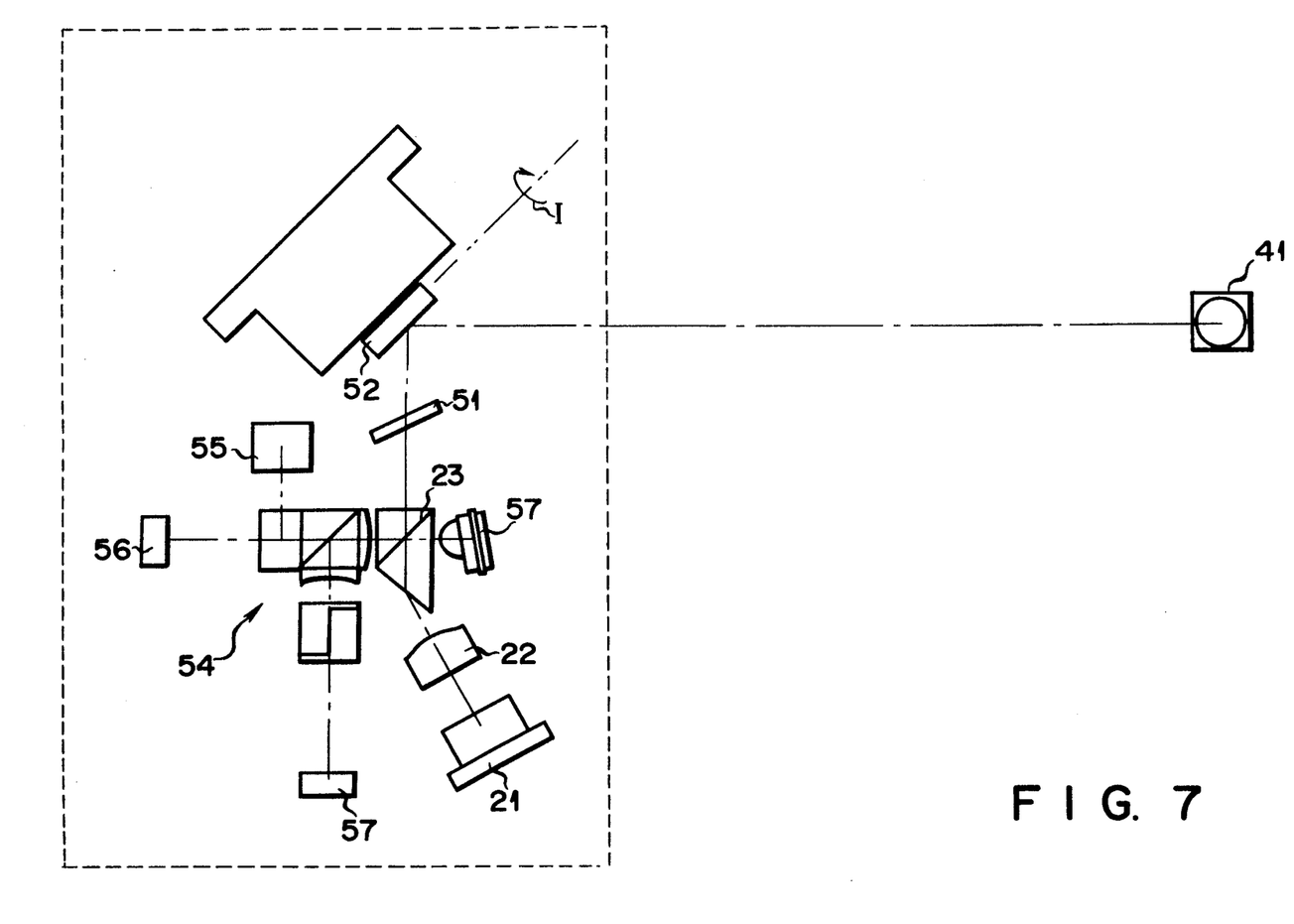
FIG. 7 schematically shows an optical system of the optical head according to the present invention.

An optical head according to an embodiment of the present invention has an optical system shown in FIG. 7 and a structure substantially similar to that of the optical head shown in FIG. 3. Therefore, the structure of the optical head will be described with reference to FIG. 3. According to the optical head of the present invention, a light beam emitted from a light source or semiconductor laser 21 is converted into parallel light beam by a collimator lens 22 and introduced into a beam splitter 23. The light beam having an oval section is converted into the one whose section is circular by that prism of the beam splitter 23 which is located on the side of receiving the light beam. The light beam which has passed through the beam splitter 23 is passed through a beam shift correcting plate 51 and reflected by a galvano-mirror 52 which is rotated round its shaft as shown by an arrow I. The optical beam reflected by this galvano-mirror 52 is directed to a carriage 11a mounted movable on guide rails (not shown). The light beam directed to the carriage 11a is passed through a resin-made cylindrical body 11h of the carriage 11a and reflected toward an objective lens 4 by a folded mirror 41 fixed to the carriage 11a. The light beam is focused on an Optical disk 25 by the objective lens 4. Divergent light beam reflected by the optical disk 25 is again converted into parallel light beam by the objective lens 4, reflected by the return mirror 41, passed through the cylindrical body 11h, and again returned to the beam splitter 23 through the galvano-mirror 52 and the beam shift correcting plate 51. The optical beam reflected by the optical disk 25 is reflected by the beam splitter 23, separated by a detecting optical system 54 which includes a focus detecting optical system, and detected by detectors 55, 56 and 57. Information recorded on the optical disk 25 can be reproduced by processing signals supplied from the detection optical system 54. Focus and track signals can be created by processing detection signals supplied from the detectors 56 and 57 by focus and track detector circuits (not shown).

As shown in FIG. 3. a focusing coil 3 which is driven responsive to focus signals is fixed to a frame 2 to which the objective lens 4 is attached, and the frame 2 is supported, movable along the optical axis of the objective lens 4, by a pair of leaf springs. A tracking coil 12 which is driven responsive to tracking signals is fixed to the cylindrical body 11h and fixing sections to which rollers running on the guide rails are fixed are provided at both ends of the tracking coil 12. Although not shown, focus and tracking magnetic circuits for generating magnetic fields interlinking those generated by the focusing and tracking coils 3 and 12 to create drive forces by which the objective 4 is moved along its optical axis and by which the carriage 11a is run on the guide rails are provided at an area where the carriage 11a is run. Therefore, the focusing coil 3 is driven responsive to focus signals applied from the focus detector circuit and the objective lens 4 is thus moved along its optical axis and held at its focusing point. As the result, the light beam passing through the objective lens 4 forms the smallest beam spot on the optical disk 25. The tracking coil is driven responsive to tracking signals applied from the track detector circuit to move the carriage 11a and the galvano-mirror 52 is rotated at a small-angle to slightly change the direction of the optical beam reflected by the galvano-mirror 52. As the result, the objective lens 4 can be held focused on tracks on the optical disk and a desired tracking guide on the optical disk can be traced by the light beam focused through the objective lens 4. More details about the structure of the separating optical system shown in FIG. 3 will be obtained from U.S. Ser. No. 538,098 (Yamasaki).

Figure 6A:
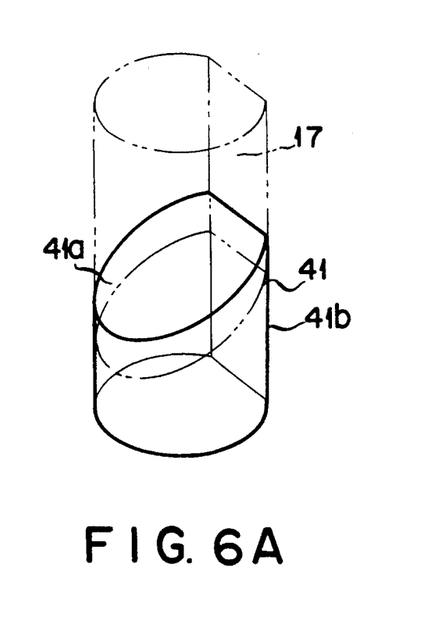
FIGS. 6A and 6B are perspective views showing a circular pole of which a mirror used for an optical head of the present invention is made, and an example of the mirror.
Figure 6B:
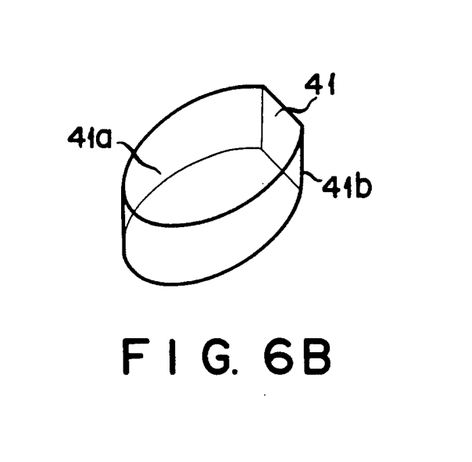
Figure 8A:
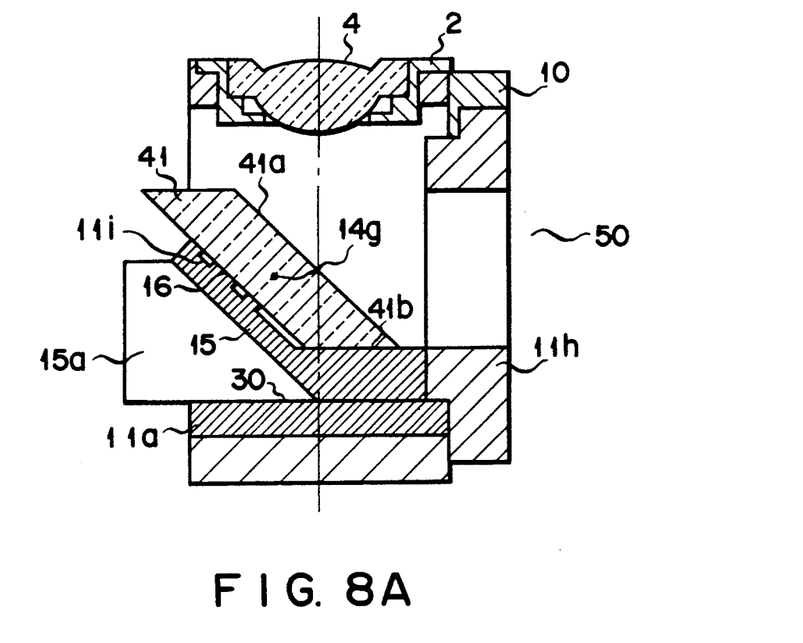
FIGS. 8A and 8B are sectional views showing how the mirror shown in FIG. 7 is attached, and showing a part of this mirror attaching structure enlarged.
Figure 8B:
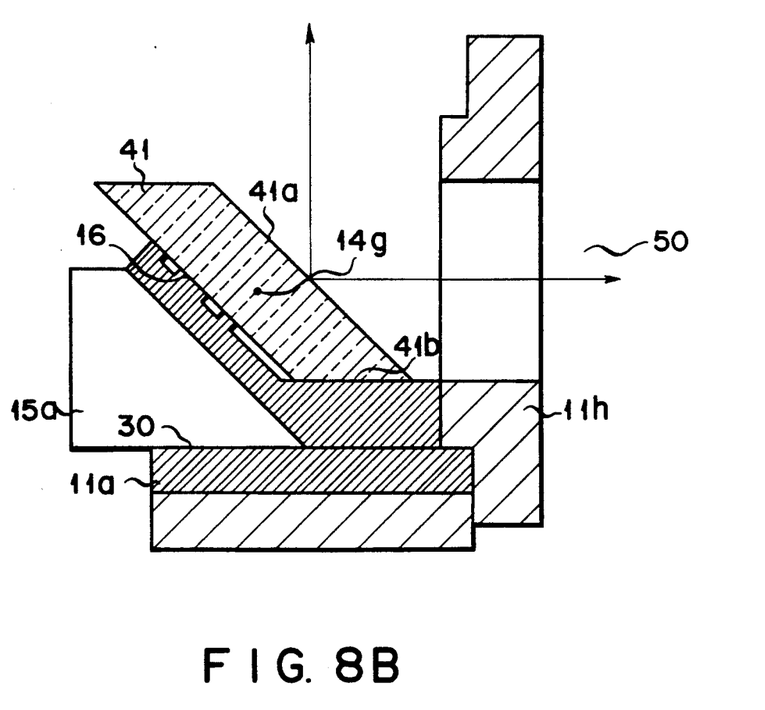

According to the present invention, a folded mirror 41 shown in FIGS. 6A and 6B is used in the structure of the separating optical system shown in FIG. 3 wherein the folded mirror 41 is located in the carriage 11a as shown in FIGS. 8A and 8B. More specifically, a glass rod 17 shaped like a circular pole and previously cut to make an end in its longitudinal direction be used as a set face as shown in FIG. 6A is prepared and obliquely sliced to provide the folded mirror 41. Therefore, the folded mirror 41 has a contour of oval pole and its reflecting face 41a is like an oval. As shown in FIGS. 8A and 8B, a cut face of the folded mirror 41 is used as a reference face 41b and contacted with the base of a tilt adjusting member 15, while a rear surface thereof is bonded to the slope 16 of the tilt adjusting member 15. The folded mirror 41 is bonded to the tilt adjusting member 15 on a straight line which passes through the center of gravity of the folded mirror 41. The tilt adjusting member 15 to which the folded mirror 41 is fixed is located above the fixing section of the center carriage 11a, while its knob 15a being held by a jig (not shown), with a clearance interposed between them. This clearance between the tilt adjusting member 15 and the fixing section of the carriage 11a is filled with adhesive 30 and the tilt adjusting member 15 is fixed to the carriage 11a by the hardening of the adhesive 30. The folded mirror 41 may be made of plastics such as resin instead of glass. When it is made of plastics, it is not made by slicing the rod-like plastics but it is directly injection-molded.

When the tilt adjusting member 15 is to be fixed to the carriage 11a, the clearance is present between them and this clearance makes it easy to adjust the tilt adjusting member 15. In the case where the tilt adjusting member 15 to which the oval folded mirror 41 has been attached is bonded and fixed directly to the center carriage 11a without any adjustment, it is difficult to avoid that the optical axis is tilted relative to the folded mirror 41, because the assembling accuracy of the linear motor 50 and the accuracy of parts for the linear motor 50 are not certain. When the adhesive 30 is present in the clearance, the tilt of the mirror 41 can be easily adjusted in a certain direction prior to the hardening of the adhesive 30. The stable optical characteristic of the folded mirror 41 can be realized.

Figure 9:
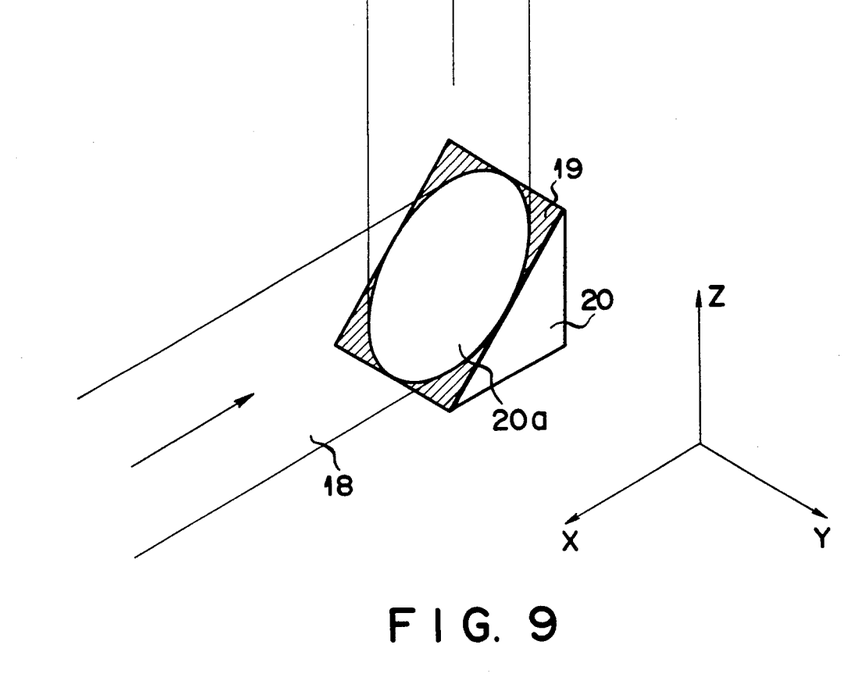
FIG. 9 is a perspective view showing a common mirror for comparison with the oval mirror shown in FIG. 6B.

The reflecting surface of the return mirror 41 is formed oval, as already described above, and this oval mirror 41 enables its reflecting surface to be used more efficiently and its weight to be made lighter, as shown in FIG. 9, as compared with the mirror whose reflecting surface is rectangular. The mass of the oval mirror relative to the projected area in the direction X can be reduced by those portions hatched in FIG. 9.

Figure 10A:
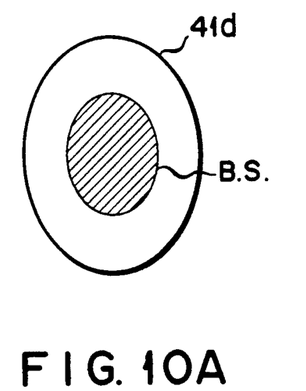
FIGS. 10A and 10C are plans showing beam spots formed on the reflecting surface of the oval mirror shown in FIG. 6B.
Figure 10B:
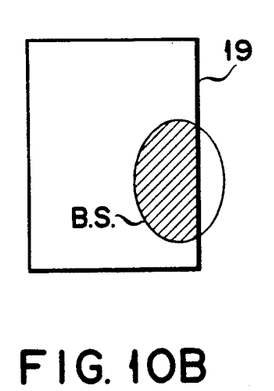
FIG. 10B is a plan showing a beam spot formed on the reflecting surface of the mirror shown in FIG. 9.
Figure 10C:
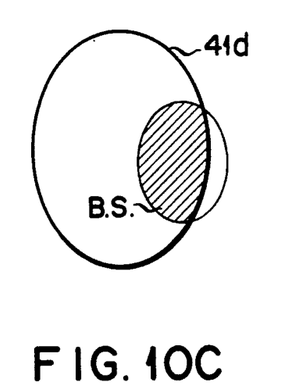

The light beam directed to the folded mirror 41 by the galvano-mirror 52 is parallel one having a substantially circular section, but the spot B.S. of the light beam projected on the folded mirror 41 is formed oval, substantially similar to the shape of a reflecting surface 41d of the folded mirror 41, as shown in FIG. 10A. When the galvano-mirror 52 is rotated responsive to the tracking signal, the direction of the light beam is changed and the beam spot is displaced on the return mirror 41. There is a case where the beam spot is largely displaced and directed outside the reflecting surface 41d of the return mirror 41 because of adjustment error in the optical system or vibration caused by disturbance, but the section of the light beam reflected by the folded mirror 41 is kept substantially circular and the beam spot is formed substantially circular on the optical disk even in this case. When a part of the light beam comes out of the reflecting surface of the folded mirror in a case where the reflecting surface of the folded mirror is rectangular as shown in FIG. 9, the light beam is reflected while breaking off a part of its oval section as hatched in FIG. 10B and the beam spot is not formed like a true circle on the optical disk. It is therefore detected that tracking error is caused no matter how the optical beam is focused on the tracks on the optical disk through the tracking detection system. In addition, there is fear that error is caused about reproducing signals. To the contrary, in a case where a part of the light beam is directed outside the oval reflecting surface of the folded mirror 41, as shown in FIG. 10C, the beam spot B.S. formed on the reflecting surface 41d is approximate to an oval as shown by a hatched portion and the optical beam having a substantially circular section is thus reflected to the optical disk.

Figure 11:
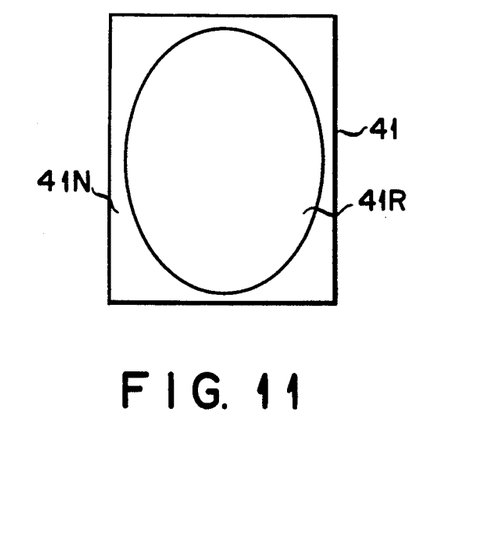
FIG. 11 is a plan showing a variation of the mirror which is incorporated into the optical head of the present invention.

The reflecting surface of the folded mirror 41 may not be formed oval but its substantially reflecting area may be formed oval. As shown in FIG. 11, for example, an oval reflecting surface 41R is formed on a rectangular plane and that portion of the rectangular plane which encloses the oval reflecting surface 41R may be coated as a non-reflecting surface 41N. The mirror 41 shown in FIG. 11 can have the function of an iris. When the light beam having a projecting section larger than the oval reflecting face 41R is made incident upon the return mirror 41, the light beam is not reflected by the non-reflecting face 41N of the return mirror 41 but reflected only the oval reflecting face 41R thereof, so that the light beam reflected by the return mirror 41 can have a circular section whatever sectional shape the incident optical beam may have. In other words, the non-reflecting face 41N of the return mirror 41 functions as the iris to make the light beam circular in section.

In the case of the above-described embodiment of the present invention, the tilt adjusting member 15 to which the folded mirror 41 has been attached is previously adjusted to have a certain position and a certain tilt. According to the structure shown in FIGS. 8A and 8B, the knob 15a of the tilt adjusting member 15 for the oval return mirror 41 is chucked, the adhesive is coated at that area of the tilt adjusting member 15 which is on the straight line passing through the centroid of the mirror 41, the rear face of the mirror 41 is fixed to the tilt adjusting member 15, the bottom of the adjusting member 15 is bonded to a fixing area 16 of the carriage 11a so as to cause the mirror optical axis to coincide with the moving direction of the carriage 11a and the reflecting face of 41a of the mirror 41 is thus adjusted to have the certain tilt while adjusting the knob 15a.

When the optical head is to be adjusted or the tilt of the folded mirror is to be adjusted to align the optical axes with each other, the return mirror 41 is previously bonded to the tilt adjusting member 15 which is provided with the knob 15a. Upon adjusting the tilt of the folded mirror, therefore, the knob 15a can be reliably chucked without holding the folded mirror 41 directly. This can prevent the mirror face of the return mirror 41 from being deflected as seen when the return mirror 41 is directly held by the vacuum pump or adhesive tape.

Further, the adhesive 30 is filled and hardened in the clearance between the carriage 11a and the tilt adjusting member 15. When the folded mirror 41 is adjusted to have a certain position and a certain tilt prior to the hardening of the adhesive 30, the tilting adjustment of the mirror can be more reliably and easily achieved.

Still further, the folded mirror 41 is bonded and fixed to the mirror-bonded area on the straight line which passes through the center of gravity of the mirror and coincide with the moving direction thereof. Centrifugal force caused when the mirror is quickly moved is therefore allowed to pass through a bonded point of the mirror and coincide on the straight line with reaction force caused at the bonded point. This makes it difficult for rotation movement to be caused, and no harmful vibration is caused even when the mirror is bounded with a relatively soft adhesive agent. The mirror-bonded area may have, therefore, an area half or smaller than that of the mirror face. In addition, the occurrence of unnecessary vibration can be prevented even when adhesive, low in hardness, is used. The mirror face of the return mirror 41 cannot be deflected by the hardening of the adhesive and the thermal deformation of the adhesive after it is hardened.

Still further, the oval folded mirror 41 is made by obliquely cutting the pole-like glass rod 17. The mirror thus made can have a higher efficiency and it can also have end faces higher in accuracy. At the same time, it can reduce its area by eliminating its portion unnecessary to form the projected area in the direction X. As the result, its weight can be made minimum and its efficient area can be made large enough.

Still further, the folded mirror 41 is provided with the out face and the cut face of the folded mirror 41 is used as the reference one 41b and the folded mirror 41 is positioned while being contacted with the tilt adjusting member 15 at the reference face 41b thereof. These components can be thus more easily assembled with a higher accuracy.

Figure 12:
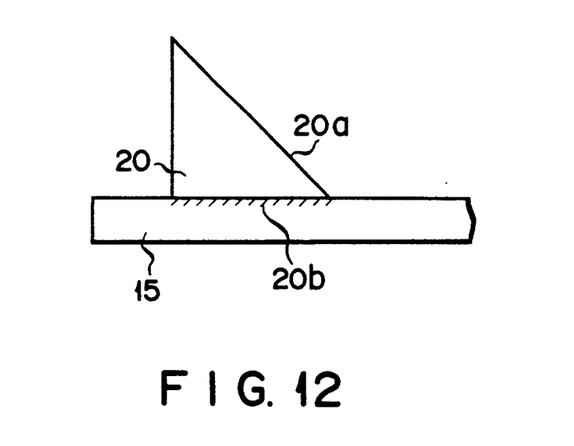
FIGS. 12 and 13 are side views showing another variation of the mirror incorporated into the optical head of the present invention.
Figure 13:
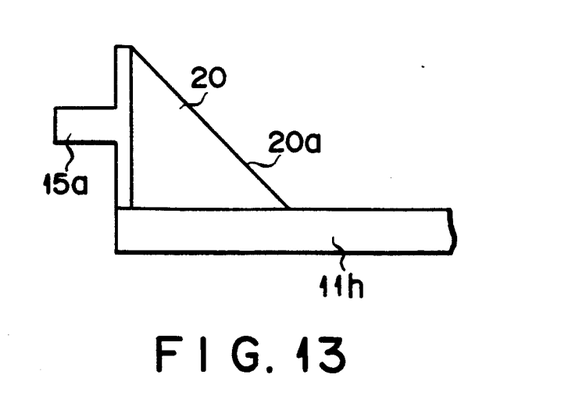

Although the oval mirror made by obliquely cutting the pole-like glass rod 17 shown in FIG. 6A has been attached to the tilt adjusting member 15 which is provided with a part to be chucked, and adjusted under this state to allow its reflecting surface to have a certain tilt, the present invention is not limited to this shape of the mirror but a triangular mirror 20 shown in FIGS. 12 and 13 may be used. It may be arranged that the knob 15a is provided at a rectangular surface of the mirror 20 except reflecting and bonded faces 20a and 20b thereof or on each of paired triangular faces thereof and chucked to hold the reflecting mirror 20 when the mirror 20 is bonded to the tilt adjusting member 15.

According to the present invention as describe above, the return mirror is previously bonded to the tilt adjusting member provided with the knob when the optical head is to be adjusted. When the tilting adjustment is to be carried out, therefore, the knob can be reliably chucked without holding directly the folded mirror, thereby preventing the mirror face of the folded mirror from being deflected as seen when the folded mirror is directly held. Further, the adhesive is filled and hardened in the clearance between the folded mirror and the tilt adjusting member. When the folded mirror is previously adjusted to have a certain position and a certain tilt prior to the hardening of the adhesive, therefore, the tilting adjustment can be more reliably and easily achieved. Still further, the folded mirror is bonded and fixed to the mirror-bonded area at a point on the straight line which passes through the center of gravity of the mirror and coincides with the moving direction thereof. This enables the mirror-bonded area to have an area half or smaller than the mirror face of the return mirror.

In addition, the occurrence of unnecessary vibration can be prevented even when adhesive, low in hardness, is used, and the mirror face of the return mirror cannot be deflected by the hardening of the adhesive and the thermal deformation of the adhesive after it is hardened.

Still further, the oval folded mirror is made by obliquely cutting the pole-like glass rod. The mirror thus made can have a higher efficiency, and a higher accuracy in the shape of its end faces. At the same time, its mass relative to the area projected in the direction X can be made minimum and its efficient area can be made larger.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims and their equivalents.

What is claimed is:

1. An optical head for retrieving information from an optical recording medium and/or recording information on the optical recording medium, comprising:
    generating means for generating light beam having a circular cross section;
    converging means for converging the light beam on the optical recording medium and;
    reflecting means, having a substantially flat oval reflecting surface, for reflecting the light beam emitted from the generating means to the converging means and reflecting the light beam from the optical recording medium to fold the optical path of the light wherein, the reflected light beam can be maintained substantially oval shaped even when a portion of said reflected light beam deviates from the substantially flat oval reflecting surface beam.

2. The optical head according to claim 1, wherein the reflecting means includes a refractor shaped substantially like an oval pole.

3. The optical head according to claim 2, wherein the refractor has a flat side face corresponding to a cut-away portion of the oval pole.

4. The optical head according to claim 1, wherein the reflecting means includes an oval reflecting surface and a non-reflecting surface enclosing the oval reflecting surface.

5. The optical head according to claim 1, further comprising means for mounting the reflecting and converging means to hold them linearly movable.

6. The optical head according to claim 1, further comprising means for tilting the light beam emitted from the light beam generating means and guiding the light beam to the converging means.

7. An optical head for retrieving information from an optical recording medium and/or recording information on the optical recording medium, comprising:
    generating means for generating light beam having a circular cross section;
    converging means for converging the light beam on the optical recording medium;
    reflecting means, having a reflecting surface and center of gravity, for reflecting the light beam emitted from the generating means to the converging means and reflecting the light beam from the optical recording medium to fold the optical path of the light beam;
    mounting means for mounting the converging means and the reflecting means to hold them movable in a moving direction; and
    fixing means for fixing the reflecting means to the mounting means on a line passing through the center of gravity of the reflecting means and extending along the moving direction of the mounting means
    said reflecting means including a refractor shaped substantially like an oval pole to maintain said reflecting light beam substantially oval shaped even when a portion of said light beam deviates from the substantially like oval pole reflecting surface, and wherein a face of the refractor has a shape of an oblique section of a pole.

8. The optical head according to claim 7, wherein the refractor has a flat side face corresponding to a cut-away portion of the oval pole.

9. The optical head according to claim 7, wherein the reflecting means includes an oval reflecting surface and a non-reflecting surface enclosing the oval reflecting surface.

10. The optical head according to claim 7, further comprising means for tilting the light beam emitted from the light beam generating means and guiding the light beam to the converging means.

11. The optical head according to claim 7, wherein said fixing means includes a member to be chucked and the reflecting surface of the reflecting means can be adjusted while tilting the member.

12. The optical head according to claim 7, wherein said fixing means includes an adhesive layer fixing the reflecting means to the mounting means.

13. An optical head for retrieving information from an optical recording medium and/or recording information on the optical recording medium, comprising:
    generating means for generating light beam having a circular cross section;
    converging means for converging the light beam on the optical recording medium;
    reflecting means, having an oval reflecting surface and center of gravity, for reflecting the light beam emitted from the generating means to the converging means and reflecting the light beam from the optical recording medium to fold the optical path of the light beam wherein the reflected light beam can be maintained substantially oval shaped even when a portion of said light beam deviates from said oval reflecting surface;
    mounting means for mounting the converging means and the reflecting means to hold them movable in a moving direction; and
    fixing means for fixing the reflecting means to the mounting means on a line passing through the center of gravity of the reflecting means and extending along the moving direction of the mounting means.

14. The optical head according to claim 13, wherein the reflecting means includes a refractor shaped substantially like an oval pole.

15. The optical head according to claim 14, wherein the refractor has a flat side face corresponding to a cut-away portion of the oval pole.

16. The optical head according to claim 13, wherein the reflecting means includes an oval reflecting surface and a non-reflecting surface enclosing the oval reflecting surface.

17. The optical head according to claim 13, further comprising means for tilting the light beam emitted from the light beam generating means and guiding the light beam to the converging means.

18. The optical head according to claim 13 wherein said fixing means includes a member to be chucked and the reflecting surface of the reflecting means can be adjusted while tilting the member.

19. The optical head according to claim 13, wherein said fixing means includes an adhesive layer fixing the reflecting means to the mounting means.

* * * * *